(12) United States Patent
Elrod et al.

(10) Patent No.: US 8,255,996 B2
(45) Date of Patent: Aug. 28, 2012

(54) NETWORK THREAT DETECTION AND MITIGATION

(75) Inventors: Craig T. Elrod, Santa Clara, CA (US); Prakash Kashyap, Cupertino, CA (US)

(73) Assignee: Extreme Networks, Inc., Santa Clara, CA (US)

(*) Notice: Subject to any disclaimer, the term of this patent is extended or adjusted under 35 U.S.C. 154(b) by 1165 days.

(21) Appl. No.: 11/322,942

(22) Filed: Dec. 30, 2005

(65) Prior Publication Data
US 2007/0157306 A1 Jul. 5, 2007

(51) Int. Cl.
*H04L 29/06* (2006.01)

(52) U.S. Cl. ............ 726/23; 726/22; 713/189; 713/190; 713/191; 713/192; 713/193; 713/194; 713/201; 370/395.54; 370/245; 455/411

(58) Field of Classification Search .......... 713/189–194, 713/201; 370/395.54, 245; 726/22, 23; 455/411
See application file for complete search history.

(56) References Cited

U.S. PATENT DOCUMENTS

| | | | |
|---|---|---|---|
| 5,450,483 A | 9/1995 | Williams | |
| 6,003,084 A | 12/1999 | Green et al. | |
| 6,356,629 B1 | 3/2002 | Fourie et al. | |
| 6,363,489 B1* | 3/2002 | Comay et al. ............... | 726/22 |
| 6,721,424 B1 | 4/2004 | Radatti | |
| 6,771,649 B1* | 8/2004 | Tripunitara et al. ..... | 370/395.54 |
| 7,027,398 B2 | 4/2006 | Fang | |
| 7,072,332 B2 | 7/2006 | D'Souza | |
| 7,076,650 B1 | 7/2006 | Sonnenberg | |
| 7,095,716 B1 | 8/2006 | Ke et al. | |
| 7,234,168 B2 | 6/2007 | Gupta et al. | |
| 7,257,515 B2 | 8/2007 | Haeuptle | |
| 7,293,238 B1* | 11/2007 | Brook et al. ............... | 715/736 |
| 7,409,714 B2 | 8/2008 | Gupta et al. | |
| 7,412,722 B1 | 8/2008 | Norris et al. | |
| 7,424,024 B2 | 9/2008 | Chen et al. | |
| 7,451,212 B2 | 11/2008 | Friedman | |
| 7,546,635 B1 | 6/2009 | Krohn et al. | |
| 7,593,343 B1 | 9/2009 | Croak et al. | |
| 7,594,259 B1 | 9/2009 | Audet et al. | |
| 7,690,040 B2 | 3/2010 | Frattura et al. | |

(Continued)

FOREIGN PATENT DOCUMENTS
WO WO 2005/112390 A1 * 12/2004

OTHER PUBLICATIONS

Kim et al., "A Flow-based Method for Abnormal Network Traffic Detection," http://dpnm.postech.ac.kr/papers/NOMS/04/security-analysis/camera-ready/attack-analysis-v5-revision.pdf, Apr. 2004.*

(Continued)

*Primary Examiner* — Jeffrey Pwu
*Assistant Examiner* — Hee Song
(74) *Attorney, Agent, or Firm* — Blakely, Sokoloff, Taylor & Zafman

(57) ABSTRACT

A network switch automatically detects undesired network traffic and mirrors the undesired traffic to a security management device. The security management device determines the source of the undesired traffic and redirects traffic from the source to itself. The security management device also automatically sends a policy to a switch to block traffic from the source.

24 Claims, 3 Drawing Sheets

U.S. PATENT DOCUMENTS

| | | | |
|---|---|---|---|
| 7,748,040 B2 * | 6/2010 | Adelstein et al. | 726/25 |
| 7,843,914 B2 | 11/2010 | Havemann et al. | |
| 8,000,329 B2 | 8/2011 | Fendick et al. | |
| 2001/0044893 A1 | 11/2001 | Skemer | |
| 2002/0015387 A1 | 2/2002 | Houh | |
| 2002/0085561 A1 | 7/2002 | Choi et al. | |
| 2002/0133717 A1 * | 9/2002 | Ciongoli et al. | 713/201 |
| 2003/0009699 A1 * | 1/2003 | Gupta et al. | 713/201 |
| 2004/0098618 A1 * | 5/2004 | Kim et al. | 713/201 |
| 2004/0172557 A1 * | 9/2004 | Nakae et al. | 713/201 |
| 2004/0250158 A1 * | 12/2004 | Le Pennec et al. | 714/4 |
| 2004/0255167 A1 * | 12/2004 | Knight | 713/201 |
| 2005/0050365 A1 * | 3/2005 | Seki et al. | 713/201 |
| 2005/0136891 A1 * | 6/2005 | Wang et al. | 455/410 |
| 2005/0216770 A1 * | 9/2005 | Rowett et al. | 713/201 |
| 2006/0018466 A1 * | 1/2006 | Adelstein et al. | 380/46 |
| 2006/0095969 A1 * | 5/2006 | Portolani et al. | 726/23 |
| 2006/0123481 A1 * | 6/2006 | Bhatnagar et al. | 726/24 |
| 2006/0153153 A1 * | 7/2006 | Bhagwat et al. | 370/338 |
| 2007/0192862 A1 * | 8/2007 | Vermeulen et al. | 726/23 |
| 2008/0127349 A1 | 5/2008 | Ormazabal et al. | |

OTHER PUBLICATIONS

Bruschi et al., "S-ARP: a Secure Address Resolution Protocol", Proceedings of the 19th Annua lComputer Security Applications Conference (ACSAC 2003), pp. 66-74, Dec. 2003. IEEE.*

Luca Deri, "Passively Monitoring Networks at Gigabit Speeds Using Commodity Hardware and Open Source Software", http://www.nlanr.net/PAM2003/PAM2003papers/3775.pdf., 2003.*

Georgios Portokalids, "Zero Hour Worm Detection and Containment using Honeypots", http://www.cs.columbia.edu/~porto/Home_files/thes-full-2side.pdf. 2004, pp. 1-73.*

Non-Final Office Action for U.S. Appl. No. 11/694,767, Mailed Oct. 5, 2009,12 Pages.

Final Office Action for U.S. Appl. No. 11/694,767, mailed Jun. 22, 2010, 18 pages.

Non-Final Office Action for U.S. Appl. No. 11/694,767, Mailed Jun. 17, 2011, 18 pages.

Final Office Action for U.S. Appl. No. 11/694,767, Mailed Oct. 24, 2011, 20 pages.

Notice of Allowance for U.S. Appl. No. 11/694,767, Mailed Jan. 30, 2012, 11 pages.

* cited by examiner

NETWORK THREAT DETECTION AND MITIGATION

FIELD

Embodiments of the invention relate to network security, and more particularly to network threat detection and mitigation.

BACKGROUND

Hacking is a term that is often used to describe the acts of a computer user who trespasses on computer systems for any number of reasons. Oftentimes, these intruders hack into a system/network with the intention of launching some form of attack against the system/network. An attacker, as used herein, refers to any computer user who hacks, trespasses, or intrudes onto a computer system or network and attempts to compromise the integrity or performance of the system or network. The term attacker may also be used herein to refer to a host system or remote host through which an attack is launched (i.e. the source of harmful or potentially harmful traffic).

Attackers can be very sophisticated and difficult to detect. Most attackers operate through a remote system or even a chain of several remote systems to obscure their identity and/or location. Attackers are often very thorough and methodical in using reconnaissance to create a detailed map of a network that provides details on any network vulnerabilities.

Reconnaissance typically involves a process of gathering information, scanning the target network, and probing for weaknesses in the target network before launching an attack. In the information-gathering phase, attackers collect information about a network (e.g. a company network) in an attempt to obtain as many domain names as possible. The domain names are then used to query domain name servers (DNS servers) for network Internet Protocol (IP) addresses. This process is sometimes called footprinting. Additionally, attackers may also perform a broad sweep of a network to probe for IP addresses.

In the scanning phase, an attacker can learn which services are running on each host and which ports the services are using. Application services can be accessed from a network through a Transmission Control Protocol (TCP) or User Datagram Protocol (UDP) port address.

In the final phase of reconnaissance, attackers search the target network specifically for resources such as devices and file resources in order to acquire information about network security and network vulnerabilities.

Once the reconnaissance process is complete, an attacker may launch an attack. There are many types of network attacks that can cause serious performance problems on a network. Attacks including, but not limited to, Denial of Service (DoS), Distribute DoS (DDoS), viruses, worms, polymorphic viruses, blended attacks, and Day-Zero threats can be launched against a network to disrupt configuration and routing information and physical network components. Attacks can also tie up and/or consume network bandwidth, central processing unit (CPU) time, and disk space.

One example of a DoS attack is a TCP Flood attack. In a TCP flood attack, an attacker sends a flood of TCP synchronize (SYN) packets to a target system, often with a forged source address. Each of these packets is handled like a connection request by the target system. Thus, the target device responds to the request by sending a TCP synchronize/acknowledge (SYN/ACK) packet and waits for a TCP ACK packet from the attacker (or the forged source address) to complete the connection as part of the normal TCP three-way handshake used to set up a connection. However, in a TCP flood attack, no TCP ACK packet is ever sent back to the target system to complete the connection. This causes half-open connections, which tie up the target system until the attack ends.

Another example of a DoS attack is a Smurf attack, which uses the PING (Packet Internet Grouper) utility to flood a target system with PING responses. In this case, the attacker broadcasts a PING request to an entire network. However, the attacker uses a source address in the PING request to make it appear that the request is coming from the target system's IP address. Thus, a flood of PING responses is sent to the target system, bogging down the target system.

Most networks employ some form of network security to help against many of the attacks discussed above. However, many network security systems and/or devices rely on signature-based security techniques. In other words, these security systems maintain a list of known security threats, or signatures, and can only prevent or mitigate damage based on these known security threats. One problem with signature-based security is that it is not effective in preventing or mitigating unknown security threats and Day-Zero attacks. Additionally, many of today's network security systems need to be "in-line" with the network to mitigate threats and can, therefore, end up being bottlenecks or points of failure.

BRIEF DESCRIPTION OF THE DRAWINGS

The following description includes discussion of various figures having illustrations given by way of example of implementations of embodiments of the invention. The drawings should be understood by way of example, and not by way of limitation.

SUMMARY OF THE INVENTION

Figure 1A:
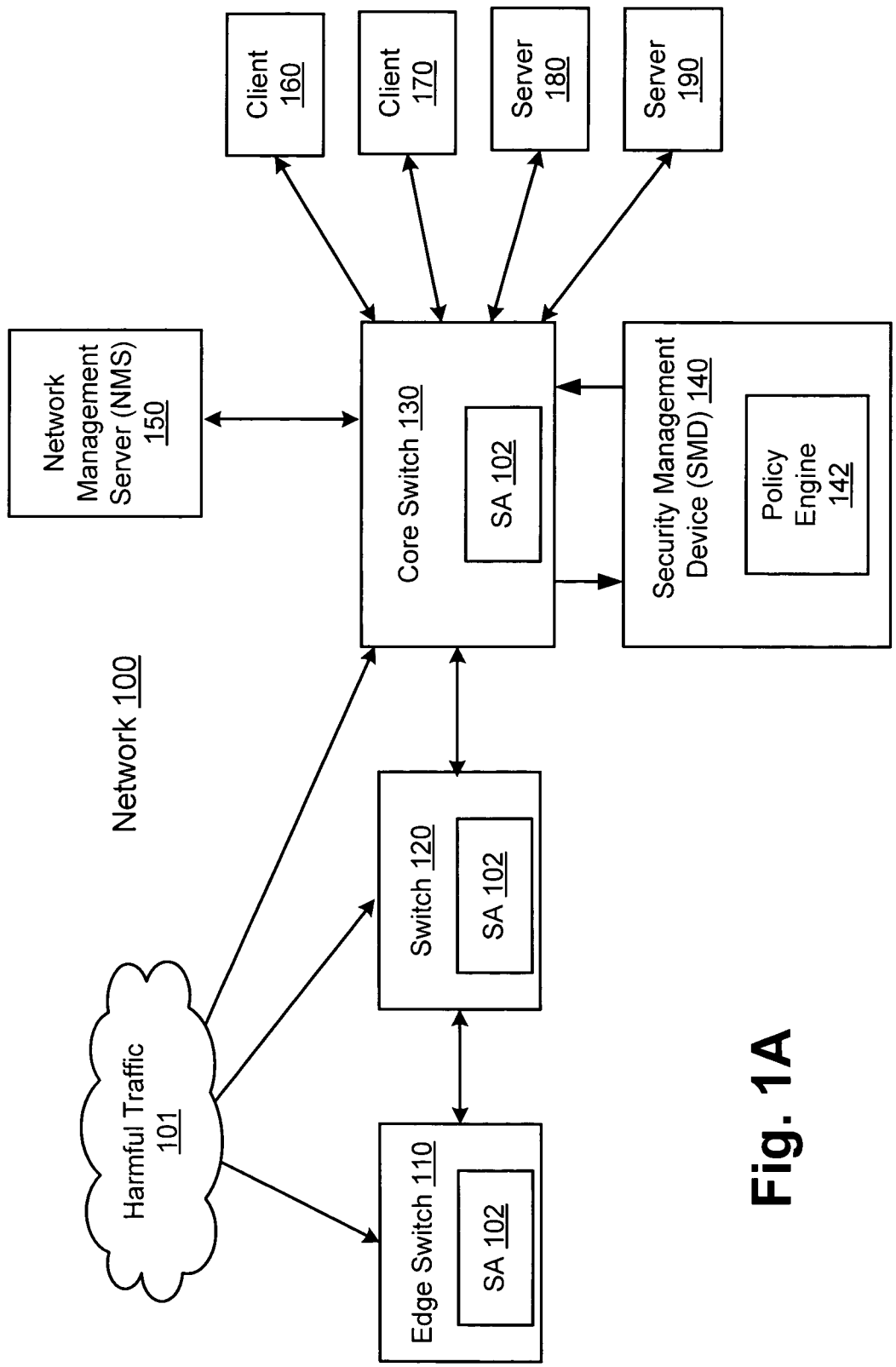
FIG. 1A is a block diagram of an embodiment of the invention.

A threat entering a network is detected at a network switch. The switch employs a policy containing policy rules to measure and examine network traffic flows. Traffic flows meeting a certain profile or exceeding a certain threshold are considered threats and are mirrored to a security management device. The security management device is able to extract information from the mirrored traffic, including packet fields from individual packets. Additional information is sent from the switch's forwarding database to the security management device. The security management device uses the information to determine the source and/or destination of the threat. Once the source of the threat is known, the security management device redirects the traffic related to the threat. In addition, the security management device builds a policy designed to mitigate the threat. This policy is sent to the network switch that originally detected the threat. The switch enforces the policy in real-time to mitigate the threat.

DETAILED DESCRIPTION

As used herein, references to one or more "embodiments" are to be understood as describing a particular feature, structure, or characteristic included in at least one implementation of the invention. Thus, phrases such as "in one embodiment"

or "in an alternate embodiment" appearing herein describe various embodiments and implementations of the invention, and do not necessarily all refer to the same embodiment. However, they are also not necessarily mutually exclusive. Descriptions of certain details and implementations follow, including a description of the figures, which may depict some or all of the embodiments described below, as well as discussing other potential embodiments or implementations of the inventive concepts presented herein. An overview of embodiments of the invention is provided below, followed by a more detailed description with reference to the drawings.

In one embodiment of the invention, threats are detected at a network switch. As used herein, threat may refer to network traffic that is a precursor to harmful network activity or that otherwise threatens the integrity/performance of the network or a system/device on the network. The terms "threat" or "network threat" may also be used interchangeably with "attack," "network attack," "attacker," "harmful traffic," "suspicious traffic," "source," or "source of harmful traffic" as used herein.

Threats are detected by a switch using dynamic policy rules designed to detect artifacts and identify footprints of the threats. In one embodiment, the switch utilizes CLEAR-Flow technology, available from EXTREME NETWORKS, INC. of Santa Clara, Calif. Dynamic policy rules are implemented, for example, using access control lists (ACLs), which define profiles of potentially problematic network traffic flows and corresponding actions to be taken by the switch if traffic flows meeting any one of these profiles are measured. In one embodiment, a switch measures the ratio of incoming Address Resolution Protocol (ARP) requests to outgoing ARP responses in the network traffic. If the ratio is above a predetermined threshold, the switch, using dynamic policy rules, may determine that a threat exists. In another embodiment, the switch measures the ratio of incoming TCP SYN packets to outgoing TCP ACK packets. Again, if the ratio is above a predetermined threshold, the switch may determine that a threat exists.

In addition to measuring ratios of packets, ACLs may be used in a switch to measure other usage-based packet statistics including, but not limited to, cumulative counts of packets meeting a certain profile, cumulative counts of packet bytes from packets meeting a certain profile, rates, or changes in rates, at which packets are received, etc.

In one embodiment, network threats are copied and sent from the switch to a security management device for further analyzing. This process of sending copies of network threats may also be referred to as mirroring. In addition to mirroring network threats, the switch sends other useful information to the security management device, for example, using an Extensible Markup Language Interface (XML) application program interface (API). The useful information can include details from the switch's forwarding database (FDB) such as media access control (MAC) addresses, IP addresses, and corresponding switch port numbers.

The security management device is able to build communication streams with the information received from the switch to determine the exact source of a threat and/or target of attack. Building communication streams can involve identifying, analyzing, tracking, and/or extracting certain packet fields or other information from network traffic, including packets. In one embodiment, the security management device may track the Source IP Address field and the Destination IP Address field of packets to determine the source and the target of the attack. In another embodiment, the security management device uses the information from the switch's FDB to determine the source and the target of the attack. Combinations of FDB information and packet field information may also be used. Thus, the security management device is able to combine collected information to construct or build a model/representation that defines/describes the communication stream between the source and the target of an attack.

Once the source of an attack has been determined, the security management device redirects the source data stream(s). In one embodiment, redirecting involves re-writing the ARP table on the attacker's system by sending unsolicited ARP requests that substitute the MAC address of the security management device in place of the MAC address of the intended target system. In other embodiments, redirecting can be done using ACLs, policy routing, virtual local area network (VLAN) identification (ID), Hypertext Transfer Protocol (HTTP) information, or XML tags. In all embodiments, redirecting causes traffic and/or data streams from the attacker to be redirected and sent to the security management device instead of the intended target system. The security management device subsequently drops, ignores, or selectively passes the redirected traffic and/or data stream(s).

In addition to redirecting the attacker's system, the security management device dynamically builds a policy to be employed at the switch. A policy defines an action or set of actions to be carried out when a predetermined event or set of events occurs. In one embodiment, this policy causes the switch to block traffic from the source of an attack based on the IP address(es) of the attacker. In other embodiments, the policy causes the switch to block traffic based on MAC address(es), VLAN IDs, or switch port number(s) used by an attacker. Further embodiments include a policy that causes the switch to quarantine traffic from the attacker to an isolated VLAN, throttle traffic from the attacker by limiting the network bandwidth to the attacker, or warn other switches of the threat/attack.

Once a policy has been built/created, the security management device sends the policy to the switch that detected the threat, for example, using the XML API mentioned above. The switch then enforces the policy to mitigate the threat/attack.

FIG. 1A illustrates an embodiment of the invention. Harmful traffic 101 enters a network 100 through a switch 110, 120, or 130. Each switch monitors/examines every packet that arrives in real-time at a one gigabit per second (Gb/s) forwarding rate or a ten Gb/s forwarding rate. In other embodiments, the switch monitors/examines packets arriving at other forwarding rates.

In one embodiment, each switch contains a security agent 102 to monitor/examine traffic flowing through the switch. Security agents 102 each contain a policy file with access control list (ACL) rules that allow security agents 102 to collect counters and statistics on traffic flowing through switches. Additional rules are included in the policy files to monitor the ACL counters and statistics. The ACL rules also define profiles of potentially problematic network traffic flows and corresponding actions to be taken by a switch if traffic flows meeting one of these profiles are measured. The policy files may be updated dynamically, which will be discussed in more detail later. Security agents 102 may also monitor a cumulative counter, a change or delta in a counter over a time interval, the ratio of two cumulative counters, and the ratio of a change or delta in two counters over a time interval.

Each switch is capable of detecting harmful traffic 101 using the dynamic policy rules discussed above. In one embodiment, harmful traffic is detected when a ratio of measured ARP requests to ARP replies exceeds a specified threshold. In another embodiment, harmful traffic is detected when a ratio of measured TCP SYN packets to TCP ACK packets exceeds a specified threshold. Harmful traffic is mirrored to a security management device (SMD) 140 reachable via, for example, a dedicated port, upon detection by a switch. Traffic that does not violate policy rules, however, passes through the switch normally. Only harmful or potentially harmful traffic is mirrored to SMD 140. In one embodiment, traffic mirrored to SMD is labeled with the threat-type "suspicious." Mirroring suspicious traffic to SMD 140 allows SMD 140 to operate "virtually" in-line rather than physically in-line with the network. In other words, it is not necessary for traffic to pass through SMD 140 to reach a destination because only copies of suspicious traffic are passed to SMD 140. Thus, SMD 140 operates without the latency or point-of-failure risks inherent in traditional/physical in-line operation. In one embodiment, SMD 140 is a single device deployed at the network core, illustrated in FIG. 1A. In other embodiments, SMD 140 can be deployed at different locations within the network, including at a network edge.

Figure 1B:
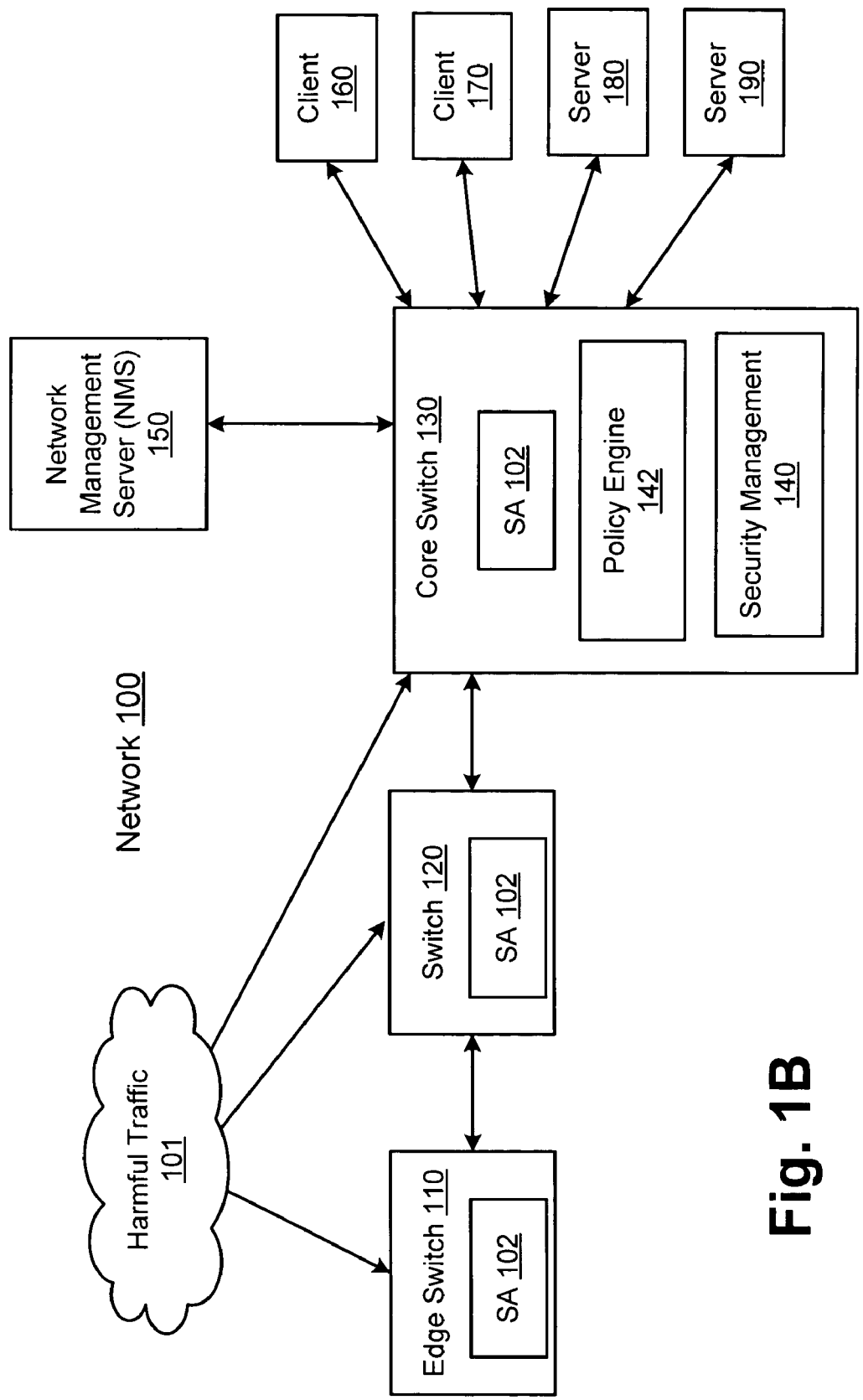
FIG. 1B is a block diagram of an embodiment of the invention.

In another embodiment, SMD functionality is implemented using a combination of SMD 140 and a network management server 150. FIG. 1B is an illustration of yet another embodiment where SMD functionality, including threat detection logic, is implemented as an application-specific integrated circuit (ASIC) or a system-on-a-chip (SoC) within core switch 130 or any other network switch.

SMD 140 uses behavior-based threat detection methods to further classify, analyze and/or mitigate suspicious traffic mirrored from a switch. In one embodiment, SMD 140 builds a communication stream by extracting information from suspicious traffic. Building a communication stream involves assembling information that allows SMD 140 to characterize the exact source and destination of the suspicious traffic. In one embodiment, the information extracted by SMD 140 includes source and destination IP addresses from the address fields of packets. In another embodiment, each switch forwards information from its forwarding database (FDB) to SMD 140 using an XML application program interface (API). The forwarded information correlates MAC addresses with IP addresses and port numbers. SMD 140 uses this information to determine the exact source and destination of the suspicious traffic.

Network threats/attackers typically conduct network reconnaissance, including probing the network's address space. Most networks actually utilize only a portion of the available address space. Thus, in one embodiment, SMD 140 uses virtual decoys in the unused address space of the network to identify threats conducting reconnaissance. In another embodiment, SMD 140 provides false data about the network's topology to the source of a threat to interfere with attempts to acquire precise data about operating systems and application versions present on the network. Providing false data about the network's topology can delay the launch of an attack, creating more time to mitigate a threat and potentially prevent an attack altogether.

Having determined the exact source (e.g. MAC address) and destination of suspicious traffic, SMD 140 continues to monitor the suspicious traffic. In one embodiment, SMD 140 uses internal policy rules to further analyze suspicious traffic and, when conditions are met, escalate the threat-type from "suspicious" to "yellow alert." SMD 140 sends a dynamic ACL to security agent(s) 102 to further refine the policy for suspicious traffic flows. The ACL is dynamic in the sense that it is automatically sent to security agent(s) 102 in response to measured traffic flows—no network administrator/operator action or intervention is needed. Security agent(s) 102 apply the dynamic ACL at the respective switch(es) in real-time while the switch(es) continue(s) to mirror suspicious traffic to SMD 140.

While monitoring suspicious traffic and updating policy files in security agents 102, SMD 140 may also determine that suspicious traffic is actually harmful traffic representing a real threat to the integrity/stability of the network or a client/server operating on the network. In one embodiment, SMD 140 escalates the threat type from "yellow alert" to "red alert" when a real threat is detected and takes action(s) to mitigate the threat.

In one embodiment, SMD 140 redirects the source data stream (i.e. the source of the suspicious traffic), for example, in response to the red alert threat level. Redirecting is the redirecting of network traffic (e.g. packets, data streams, etc.) from an intended destination to an alternate destination where the redirection is not initiated by the source of the traffic. In other words, redirecting occurs when an attacker sends harmful or suspicious traffic to an intended destination and something/someone other than the attacker initiates a redirection of that traffic to an alternate destination. In most cases, the attacker will be unaware of the redirection of traffic, though it is not necessary that the attacker be unaware of this redirection.

In one embodiment, SMD 140 redirects the source data stream by reformulating the ARP tables of the source computer system. ARP table reformulation involves sending unsolicited ARP responses to the source computer system. Once received, these unsolicited ARP responses substitute the MAC address of SMD 140 in place of the MAC address of the intended destination/target system. Thus, the ARP reformulation causes all traffic from the source computer system that is intended for a particular target system to be received instead by SMD 140. In other embodiments, redirecting can be done using ACLs, policy routing, virtual local area network (VLAN) identification (ID), Hypertext Transfer Protocol (HTTP) information, or XML tags. In each of the above examples, SMD 140 initiates the redirecting process that causes traffic intended for a particular target system to be redirected to SMD 140.

SMD 140 can handle redirected traffic (e.g. packet traffic) in different ways. SMD 140 may ignore redirected packet traffic or silently discard it. In either case, the effect is that SMD 140 becomes a dead end for this traffic, thus eliminating any potential harm to the network from the traffic. However, if traffic flow conditions change or SMD 140 otherwise determines that certain packets are harmless, those packets may be forwarded to their originally intended destination.

In addition to redirecting the source data stream, SMD 140 builds a policy to mitigate the threat and/or block the source of the attack. In one embodiment, a policy engine 142 automatically generates policy rules for the policy. In another embodiment, NMS 150 generates policy rules for the policy.

In one embodiment, the policy is designed to cause network switches to block traffic based on the IP address(es) of the attacker. In other words, all traffic having a particular source IP address or source/destination IP address combination is blocked when detected at one of the network switches. In other embodiments, the policy causes network switches to block traffic based on MAC address(es), VLAN ID(s), switch port number(s), or other identifying information.

It is not necessary that the policy cause a switch to block traffic. Alternative embodiments may include a policy that causes a switch to quarantine harmful traffic to an isolated VLAN, throttle traffic from the attacker by limiting the network bandwidth available to the attacker, or warn other switches of the threat/attack.

After the policy has been built/created, it is sent from SMD 140 to the switch(es). In one embodiment, SMD 140 sends the policy to all switches. In another embodiment, SMD 140 sends the policy only to one switch. For example, if only a single switch stands logically between an attacker and the rest of the network, SMD 140 may only need to send the policy to that single switch. Security agent 102 implements the policy in real-time once it is received at the switch to mitigate harmful traffic.

Figure 2:
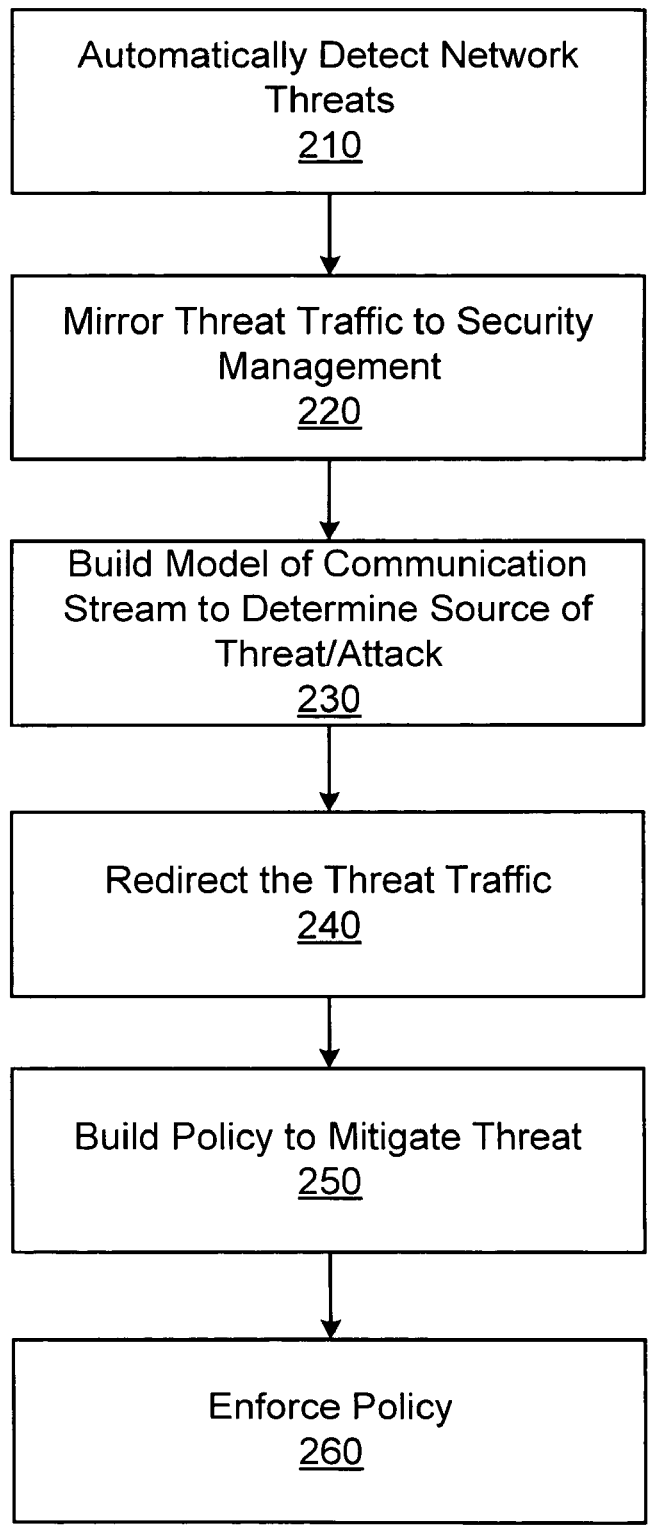
FIG. 2 is a flow diagram of an embodiment of the invention.

FIG. 2 is a flow diagram illustrating an embodiment of the invention. When a threat enters the network it is automatically detected 210. The network has the capability of measuring traffic flows. In one embodiment, a switch or other network device measures the ratio of incoming ARP requests to outgoing ARP responses in the network traffic. If the ratio is above a predetermined threshold, the switch or other network device, using dynamic policy rules, may determine that a threat exists. In another embodiment, the switch or other network device measures the ratio of incoming TCP SYN packets to outgoing TCP ACK packets. Again, if the ratio is above a predetermined threshold, the switch or other network device may determine that a threat exists.

In addition to measuring ratios of packets, ACLs may be used in a switch to measure other usage-based packet statistics including, but not limited to, cumulative counts of packets meeting a certain profile, cumulative counts of packet bytes from packets meeting a certain profile, rates at which packets are received, etc.

When a switch or other device determines that a traffic flow has exceeded a predetermined threshold, meets a certain profile, or is otherwise a threat, the switch/device mirrors that traffic flow to security management 220. In one embodiment, a security management device having a dedicated port to receive mirrored threat traffic handles security management. In another embodiment, a security management device shares security management tasks with a network management server. In yet another embodiment, security management functionality is implemented on an ASIC within a network switch. Security management can extract information from the mirrored threat traffic flows, including packet fields from individual packets. Thus, security management can extract source and destination IP address fields from packets in the mirrored threat traffic.

In one embodiment, the switch or other network device that detects a threat sends other information to security management in addition to mirroring the threat traffic flow, including information from the switch's forwarding database that correlates MAC addresses with IP addresses and/or port numbers. With this information, security management re-creates, or builds, a model of the communication stream between the source of the threat traffic and the intended destination of the threat traffic to determine the exact source and intended destination of the threat/attack 230.

Once the source of the threat traffic is known, security management redirects the threat traffic 240. Redirecting is the redirecting of network traffic (e.g. packets, data streams, etc.) from an intended destination to an alternate destination where the redirection is not initiated by the source of the traffic. In other words, redirecting occurs when an attacker, having intended to send traffic to a particular destination, sends the traffic to an alternate destination due to some form of traffic redirection not initiated/intended by the attacker.

In one embodiment, security management redirects the threat traffic by reformulating the ARP tables of the source computer system (i.e. the computer system sending the threat traffic). In other embodiments, redirecting can be done using ACLs, policy routing, virtual local area network (VLAN) identification (ID), Hypertext Transfer Protocol (HTTP) information, or XML tags. In each of the above examples, security management initiates the redirecting process that causes traffic intended for a particular target system to be redirected to an alternate destination. In one embodiment, threat traffic is redirected to a security management device connected to a switch. In another embodiment, threat traffic is redirected a particular switch having security management functionality. In yet another embodiment, redirecting causes threat traffic to be redirected to a network management server.

Security management also dynamically builds/creates a policy to mitigate the threat 250. In one embodiment, security management generates policy rules that cause a switch or other network device to block all incoming traffic from a particular source or block traffic having a particular destination. In other embodiments, the switch redirects traffic based on MAC addresses or IP addresses detected in incoming traffic. Other characteristics or profiles may also be used in determining which traffic to block. In addition to blocking traffic, policy rules can be created to cause a switch or other network device to throttle traffic from a particular source or throttle traffic traveling toward a particular destination. Other embodiments include rules for quarantining threat traffic to a designated VLAN and rules that cause other network switches or device to be warned of a threat/attack.

Once a policy has been created, it is sent to one or more network switches/devices, where it is enforced 260. Network switches/devices continue to monitor/examine traffic in real-time. As conditions or traffic flows change, security management may modify the policy for a particular switch/device or set of switches/devices.

What is claimed is:

1. In a security management device, a method of detecting and mitigating a network threat, comprising:
   providing false data about a network topology in which the security management device operates to a source of a network threat, wherein the false data is provided by the security management device responsive to a probe received at a virtual decoy established by the security management device within otherwise unused address space available to the network topology;
   receiving mirrored traffic from a network switch communicably interfaced with the security management device, wherein the mirrored traffic is a copy of traffic in a communication stream initially received at the network switch and suspected to be undesired traffic by the network switch, and wherein the security management device is to conduct threat analysis on the mirrored network traffic received;
   analyzing the mirrored traffic to determine the source of the undesired traffic and the network threat based on information within the mirrored traffic and based on information provided by the network switch;
   causing the communication stream initially received at the network switch to be sent from the source of the undesired traffic and the network threat to the security management device instead of the network switch targeted by the source using a reformulated ARP table of the source, and based further on one or more of Access Control Lists (ACLs), policy-based routing, Virtual Local Area Network Identifications (VLAN IDs), HyperText Transfer Protocol (HTTP) information, or Extensible Markup Language (XML) tags; and
   blocking traffic from the source of the undesired traffic and the network threat at the security management device.

2. The method of claim 1, wherein the traffic in the communication stream initially received at the network switch is suspected to be undesired traffic based on: measuring a ratio of Address Resolution Protocol (ARP) requests to ARP replies in a network traffic stream; and comparing the measured ratio to a threshold ratio.

3. The method of claim 1, wherein the traffic in the communication stream initially received at the network switch is suspected to be undesired traffic based on: measuring a ratio of Transmission Control Protocol (TCP) SYN packets to TCP ACK packets in a network traffic stream; and comparing the measured ratio to a threshold.

4. The method of claim 1, wherein analyzing the mirrored traffic to determine the source comprises determining a Media Access Control (MAC) address of the source.

5. The method of claim 1, further comprising determining a destination for the undesired traffic.

6. The method of claim 5, wherein the source and destination addresses are Internet Protocol (IP) addresses.

7. The method of claim 6, wherein determining the source and destination addresses comprises extracting a source IP address and a destination IP address from a header of an IP packet in the undesired traffic.

8. The method of claim 1, wherein causing the communication stream initially received at the network switch to be sent from the source to the security management device comprises causing traffic originating from the source to be sent directly to the security management device.

9. The method of claim 1, wherein the reformulated ARP table of the source causes traffic originating from the source to be sent to an address of the security management device.

10. The method of claim 1, wherein causing the communication stream initially received at the network switch to be sent to the security management device comprises causing traffic from the source to be redirected to the security management device.

11. The method of claim 1, further comprising sending a policy to one or more network switches communicably interfaced with the security management device to block traffic from the source, wherein one of the one or more network switches is a switch that is nearest to the source.

12. A system for detecting and mitigating a network threat, comprising:

a security management device to provide false data about a network topology in which the security management device operates to a source of a network threat, wherein the false data is provided by the security management device responsive to a probe received at a virtual decoy established by the security management device within otherwise unused address space available to the network topology;

a network switch communicably interfaced with the security management device to automatically detect undesired traffic in a communication stream received at the network switch;

the network switch to further mirror the automatically detected undesired traffic to the security management device for threat analysis on the automatically detected undesired traffic received;

the security management device to further:

receive undesired traffic mirrored from the switch;

determine the source of the undesired traffic and the network threat based on forwarding database (FDB) information received from the network switch; cause the communication stream initially received at the network switch to be sent from the source of the undesired traffic and the network threat to the security management device instead of the network switch targeted by the source using a reformulated ARP table of the source, and based further on one or more of Access Control Lists (ACLs), policy-based routing, Virtual Local Area Network Identifications (VLAN IDs), HyperText Transfer Protocol (HTTP) information, or Extensible Markup Language (XML) tags; and block traffic from the source of the undesired traffic and the network threat at the security management device.

13. The system of claim 12, where the security management device is virtually in-line within the network and not physically in-line with the network, and wherein only copies of traffic suspected to be undesired traffic are passed to the security management device.

14. The system of claim 12, wherein the security management device causes the communication stream to be redirected from the source of the undesired traffic to the security management device.

15. The system of claim 12, wherein the security management device receives undesired traffic on a dedicated port.

16. An apparatus for detecting and mitigating a network threat, the apparatus comprising:

means for providing false data about a network topology in which the security management device operates to a source of a network threat, wherein the false data is provided by the security management device responsive to a probe received at a virtual decoy established by the security management device within otherwise unused address space available to the network topology;

means for receiving mirrored traffic from a network switch communicably interfaced with the security management device, wherein the mirrored traffic is a copy of traffic in a communication stream initially received at the network switch and suspected to be undesired traffic by the network switch, and wherein the security management device is to conduct threat analysis on the mirrored network traffic received;

means for analyzing the mirrored traffic to determine the source of the undesired traffic and the network threat based on information within the mirrored traffic and based on information provided by the network switch;

means for causing the communication stream initially received at the network switch to be sent from the source of the undesired traffic and the network threat to the security management device instead of the network switch targeted by the source using a reformulated ARP table of the source, and based further on one or more of Access Control Lists (ACLs), policy-based routing, Virtual Local Area Network Identifications (VLAN IDs), HyperText Transfer Protocol (HTTP) information, or Extensible Markup Language (XML) tags; and means for blocking traffic from the source of the undesired traffic and the network threat at the security management device.

17. The apparatus of claim 16, further comprising: means for measuring a ratio of Address Resolution Protocol (ARP) requests to ARP replies in a network traffic stream; and means for comparing the measured ratio to a threshold ratio to determine whether traffic in the communication stream is suspected to be the undesired traffic.

18. The apparatus of claim 16, further comprising: means for measuring a ratio of Transmission Control Protocol (TCP) SYN packets to TCP ACK packets in a network traffic stream; and means for comparing the measured ratio to a threshold to determine whether traffic in the communication stream is suspected to be the undesired traffic.

19. The apparatus of claim 16, further comprising means for determining the source of the threat and/or the undesired traffic received based on a Media Access Control (MAC) address of the source.

20. The apparatus of claim 16, further comprising means for determining a destination for the undesired traffic.

21. The apparatus of claim 16, wherein the means for causing the communication stream initially received at the network switch to be sent from the source to the security management device comprises causing traffic originating from the source to be sent directly to the security management device.

22. The apparatus of claim 16, wherein the reformulated ARP table of the source causes traffic originating from the source to be sent to an address of the security management device.

23. The apparatus of claim 16, wherein the means for causing the communication stream initially received at the network switch to be sent to the security management device comprises causing traffic from the source to be redirected to the security management device.

24. The apparatus of claim 16, further comprising means for automatically sending a policy to one or more network switches communicably interfaced with the security management device to block traffic from the source, wherein one of the one or more network switches is a switch that is nearest to the source.

* * * * *